United States Patent
Shigemitsu et al.

(10) Patent No.: US 8,852,066 B2
(45) Date of Patent: Oct. 7, 2014

(54) HEARTH ROLL HAVING HIGH MN BUILD-UP RESISTANCE

(75) Inventors: Tatsuhiro Shigemitsu, Tokyo (JP); Junichi Yasuoka, Tokyo (JP)

(73) Assignee: Nippon Steel Hardfacing Co., Ltd., Tokyo (JP)

( * ) Notice: Subject to any disclaimer, the term of this patent is extended or adjusted under 35 U.S.C. 154(b) by 305 days.

(21) Appl. No.: 13/567,347

(22) Filed: Aug. 6, 2012

(65) Prior Publication Data

US 2014/0038800 A1 Feb. 6, 2014

(51) Int. Cl.
*C23C 4/04* (2006.01)

(52) U.S. Cl.
USPC ........... 492/54; 29/895.32; 428/472; 428/697

(58) Field of Classification Search
USPC .................. 266/103; 29/895.32; 492/53, 54; 428/469, 472, 697, 698, 699, 701, 702; 432/8, 246
See application file for complete search history.

(56) References Cited

U.S. PATENT DOCUMENTS

| | | | |
|---|---|---|---|
| 6,199,281 B1 * | 3/2001 | Lee et al. .................... | 29/895.32 |
| 6,309,762 B1 * | 10/2001 | Speckert ........................ | 428/683 |
| 2011/0104449 A1 * | 5/2011 | Shigemitsu et al. .......... | 428/174 |
| 2013/0330520 A1 * | 12/2013 | Shigemitsu et al. .......... | 428/174 |

FOREIGN PATENT DOCUMENTS

| | | | | | |
|---|---|---|---|---|---|
| JP | 5073906 | A | * | 7/1975 | .............. C04B 35/10 |
| JP | 57131358 | A | * | 8/1982 | ................ C23C 8/52 |
| JP | 6174318 | A | * | 1/1985 | ................ C23C 4/06 |
| JP | 60141819 | A | * | 7/1985 | ................ C21D 1/00 |
| JP | 61174317 | A | * | 8/1986 | ................ C23C 4/06 |
| JP | 63-250449 | | | 10/1988 | |
| JP | 05247621 | A | * | 9/1993 | ................ C21D 1/00 |
| JP | 08-067960 | | | 3/1996 | |
| JP | 10-195547 | | | 7/1998 | |
| JP | 2005206930 | A | * | 8/2005 | ................ C23C 4/10 |
| JP | 2007-321203 | A | * | 7/2006 | ................ C23C 4/10 |

OTHER PUBLICATIONS

Translation of JP-10195547 A acquired from JPO database on Jul. 23, 2014.*

* cited by examiner

*Primary Examiner* — David Bryant
*Assistant Examiner* — Jason L Vaughan
(74) *Attorney, Agent, or Firm* — Wenderoth, Lind & Ponack, L.L.P.

(57) ABSTRACT

The hearth roll includes a thermally sprayed coating formed on the surface thereof. The thermally sprayed coating includes a nitride, an oxide, or a multiple oxide, and a matrix material composed of one or two or more metals. In the hearth roll having high Mn build-up resistance, the following expressions are satisfied: 3% by volume$\leq X_1 \leq$50% by volume; 3% by volume$\leq X_2 \leq$50% by volume; and 40% by volume$\leq X_1+X_2 \leq$80% by volume, in which $X_1$ is the percentage by volume of the nitride contained in the thermally sprayed coating with respect to the total volume (10% by volume) of the thermally sprayed coating, and $X_2$ is the percentage by volume of the oxide or the multiple oxide contained in the thermally sprayed coating with respect to the total volume of the thermally sprayed coating.

4 Claims, No Drawings

HEARTH ROLL HAVING HIGH MN BUILD-UP RESISTANCE

BACKGROUND OF THE INVENTION

1. Field of the Invention

The present invention relates to a hearth roll disposed in a continuous heat treatment furnace and used to convey a steal sheet, and particularly to a sprayed coating thermally-sprayed onto the outer surface of the hearth roll.

2. Description of the Related Art

A hearth roll disposed in a heat treatment furnace for steel sheets is used for a long time in a weakly-oxidizing or reducing atmosphere at 600 to 1,300° C. It has been considered that Fe oxides and iron powder adhering to a steel sheet form an adherent deposit called "build-up" on the surface of the hearth roll. However, one recent problem due to an increase in use of high tensile strength steel and changes in furnace operating conditions etc. is build-up of Mn oxides.

When build-up occurs on a hearth roll, flaws are formed on the steel sheet, causing a reduction in quality. To improve build-up resistance, Patent Literature 1 discloses a hearth roll in which Ti nitride or Ti carbide has been thermally-sprayed onto the surface of the body of the roll.

Patent Literature 2 discloses a hearth roll having a coating of cermet composed of a ceramic material such as $MgAl_2O_4$ having low reactivity with manganese oxides and MCrAlY containing limited amounts of Al and Cr to reduce reactivity with the manganese oxides.

To overcome a drawback in Patent Literature 1, Patent Literature 3 discloses a hearth roll including: a cermet coating formed of a refractory metal and TiN particles coated with a metal oxide stable at high temperatures; and a metal bonding layer formed between the cermet coating and the roll.

Patent Literature 1: Japanese Patent Application Laid-Open No. Sho. 63-250449

Patent Literature 2: Japanese Patent Application Laid-open No. Hei. 08-67960

Patent Literature 3; Japanese Patent Application Laid-Open No. Hei. 10-195547

As described above, the conventional build-up is composed mainly of Fe. However, in recent years, because of an increase in use of high tensile strength steel and changes in furnace operating conditions etc., Mn build-up composed mainly of Mn rather than Fe is becoming a serious problem.

TiN and TiC in the hearth roll disclosed in Patent Literature 1 themselves are materials having high wear resistance and build-up resistance. However, since the thermally sprayed coating is oxidized during thermal spraying, the structure of the coating has a large number of pores and is very brittle. Therefore, when in contact with a steel sheet, the coating wears and flakes off, and long-term use of the hearth roll is difficult.

In Patent Literature 3 in which this drawback has been improved, a coating formed of cermet is used, and a bonding layer is provided between the coating and the base material of the roll. This allows improvement in wear resistance and thermal shack resistance of the coating. In addition, TiN is coated with a metal. Therefore, during thermal spraying, oxidation of TiN is prevented, and simultaneously the coating metal is converted to oxide having abradability. It has been expected that these can improve build-up resistance.

However, in practice, although the oxidation of TiN during thermal spraying could be prevented to some extent, the degree of prevention was insufficient, and almost no oxidation of the coating metal occurred because the time of flight of the thermal spray material was too short (on the order of few msec). Therefore, the build-up resistance achieved was not sufficient. In addition, the TiN particles must be coated with a metal using a technique such as plating, PVD, CVD, or mechanical alloying. This results in an increase in cost, causing an economic problem.

In Patent Literature 2, thermal shock resistance and wear resistance were improved when the ratio of MCrAlY was high. However, the build-up resistance achieved by limiting the amounts of Al and Cr was not sufficient.

As described above, with the conventional technologies, the above-described required characteristics cannot be satisfied.

The object of each of the above Patent Literatures is to prevent build-up composed mainly of Fe. However, no consideration is given to the recent problem of build-up composed mainly of Mn.

SUMMARY OF THE INVENTION

The present invention has been made to solve the foregoing conventional problems, and it is an object to provide a hearth roll having high resistance to build-up of Mn-based materials.

To solve the foregoing problems, the present invention provides a hearth roll having high Mn build-up resistance, the hearth roll comprising a thermally sprayed coating formed on a surface thereof, wherein the thermally sprayed coating includes a nitride of one element selected from the group consisting of Ti, Nb, Ta, Cr, and Fe, an oxide of one element selected from the group consisting of Y, Ce, Nd, Al, and Cr or a multiple oxide of two or more of the elements, and a matrix metal composed of one or two or more metals selected from the group consisting of refractory metals usable at 900° C. or higher, and wherein the following conditional expressions (1) to (3) are satisfied:

$$3\% \text{ by volume} \leq X_1 \leq 50\% \text{ by volume;} \quad (1)$$

$$3\% \text{ by volume} \leq X_2 \leq 50\% \text{ by volume; and} \quad (2)$$

$$40\% \text{ by volume} \leq X_1 + X_2 \leq 80\% \text{ by volume;} \quad (3)$$

in which $X_1$ is the percentage by volume of the nitride contained in the thermally sprayed coating with respect to the total volume (100% by volume) of the thermally sprayed coating, and $X_2$ is the percentage by volume of the oxide or the multiple oxide contained in the thermally sprayed coating with respect to the total volume (100% by volume) of the thermally sprayed coating.

The matrix metal composed of one or two or more metals selected from the group consisting of refractory metals usable at 900° C. or higher may be a matrix metal composed of one or two or more metals selected from the group consisting of NiCr alloys, Hastelloy alloys, Inconel alloys, Incoloy alloys, Stellite alloys, and MCrAlY with M being one or two or more metal elements selected from Fe, Ni, and Co.

Preferably, the thickness of the thermally sprayed coating is 10 μm or larger and 1,000 μm or lower.

According to the present invention, a hearth roll having high resistance to build-up of Mn-based materials can be provided.

DETAILED DESCRIPTION OF THE INVENTION

An embodiment of the invention, i.e., a hearth roll having high Mn build-up resistance, will next be described in detail.

According to the studies by the present inventors, each of the thermal spray materials constituting the thermally sprayed coating in the present embodiment has the following properties, The nitride of one element selected from the group consisting of Ti, Nb, Ta, Cr, and Fe (hereinafter may be simply referred to as a nitride) has high resistance to build-up of Mn-based materials (hereinafter may be referred to as Mn build-up resistance). Similarly, the oxide of one element selected from the group consisting of Y, Ce, Nd, Al, and Cr or a multiple oxide of two or more of the elements that is used in the present embodiment (hereinafter may be simply referred to as an oxide) has high resistance to build-up of Mn-based materials, although the degree of resistance is not as high as that of the nitride. These nitride and oxide have conventionally been used singly. However, the present inventors have made extensive studies and found that, when both the nitride and oxide are used and dispersed in a thermally sprayed coating at a prescribed ratio, much higher resistance to build-up of Mn-based materials can be obtained by the synergistic effect of these materials.

The "prescribed ratio" means that the following conditional expressions (1) to (3) are satisfied.

$$3\% \text{ by volume} \leq X_1 \leq 50\% \text{ by volume} \quad (1)$$

$$3\% \text{ by volume} \leq X_2 \leq 50\% \text{ by volume} \quad (2)$$

$$40\% \text{ by volume} \leq X_1 + X_2 \leq 80\% \text{ by volume} \quad (3)$$

Here, $X_1$ is the percentage by volume of the nitride contained in the thermally sprayed coating with respect to the total volume (100% by volume) of the thermally sprayed coating, and $X_2$ is the percentage by volume of the oxide or the multiple oxide contained in the thermally sprayed coating with respect to the total volume of the thermally sprayed coating.

In the expressions (1) and (2), if each of the amounts of the nitride and oxide are lower than 3% by volume, the Mn build-up resistance decreases. If each of the amounts of the nitride and oxide is higher than 50% by volume, the amount of the matrix metal becomes low, and thermal shock resistance and wear resistance may decrease. In the expression (3), if the total amount of the nitride and oxide is lower than 40% by volume, the Mn build-up resistance decreases. If the total amount of the nitride and oxide is higher than 80% by volume, the amount of the matrix metal becomes low, and the thermal shock resistance and wear resistance decrease.

Both the nitride and oxide are high-hardness materials, and the matrix metal composed of one or two or more metals selected from the group consisting of refractory metals (including alloys) usable at 900° C. or higher (hereinafter may be simply referred to as a matrix metal) has high heat resistance and high oxidation resistance and can firmly secure the nitride and oxide to the coating. Therefore, high thermal shock resistance and high wear resistance can be maintained for a long time.

More specifically, to exhibit high resistance to build-up of Mn-based material, high thermal shock resistance, and high wear resistance, the thermally sprayed coating must contain all the above three materials, i.e., the nitride, the oxide, and the matrix metal.

In this regard, the above finding is different from the concepts of Patent Literatures 1 to 3.

Any of TiN, NbN, TaN, CrN, $Fe_3N$, etc. can be used as the nitride used in the hearth roll having high Mn build-up resistance in the present embodiment. Oxides such as $Y_2O_3$, $CeO_2$, $Nd_2O_3$, and $Al_2O_3$ can be used as the oxide used in the hearth roll having high Mn build-up resistance in the present embodiment. Multiple oxides such as $YCrO_3$ can be used as the multiple oxide used in the hearth roll having high Mn build-up resistance in the present embodiment. Any of FeCrAlY, NiCrAlY, CoCrAlY, CoNiCrAlY, NiCr, Hastelloy C276, Inconel 600, Incoloy 800, Stellite 6, etc. can be used as the matrix metal used in the hearth roll.

The thermal spray material used in the present embodiment can be obtained, for example, by mixing the nitride, oxide, and matrix metal having a thermally sprayable size, or adding an organic binder to the fine powders of the nitride, oxide, and matrix metal and then granulating the powder. Examples of the method of granulation used may include spray granulation, fluidized-bed granulation, and mechanical alloying. In addition, debindering and sintering may be performed although they are not always necessary.

The thermal spray material in the present embodiment can be thermally sprayed by flame spraying, plasma spraying, HVOF spraying, detonation flame spraying, and other spraying methods. Of these, HVOF spraying and detonation flame spraying are preferred because they have low thermal effects and can form a dense coating.

If the thickness of the thermally sprayed coating is less than 10 μm, its effects cannot be obtained. If the thickness is larger than 1,000 μm, residual stress becomes high, and there is a high possibility that flaking occurs. Therefore, the thickness of the thermally sprayed coating is preferably 10 μm or larger and 1,000 μm or lower.

To further improve the thermal shock characteristics, a thermally sprayed undercoating formed of MCrAlY (M is one or two or more metal elements selected from Fe, Ni, and Co), a NiCr alloy, a Hastelloy alloy, an Inconel alloy, Ni—Al, Mo, etc. may be interposed between the thermally sprayed coating and the roll base. More specifically, a coating having a multi-layer structure also falls within the scope of the present invention.

As described above, the hearth roll in the embodiment of the invention has high Mn build-up resistance. More specifically, a thermal spray material containing controlled amounts of the prescribed three materials, i.e., the prescribed nitride, oxide, and matrix metal, is thermally sprayed onto the surface of a hearth roll, whereby the hearth roll having Mn build-up resistance can be provided.

EXAMPLES

The hearth roll having high Mn build-up resistance of the present invention will next be described in more detail by way of Examples. However, the hearth roll having high Mn build-up resistance of the present invention is not limited to the following Examples.

The Mn build-up resistance of each of thermal spray materials in Examples 1 to 6 and Comparative Examples 1 to 14 shown in Table 1 was evaluated.

TABLE 1

COMPOSITION OF THERMALLY SPRAYED COATING

| | | NITRIDE (% BY VOLUME) | OXIDE (% BY VOLUME) | TOTAL AMOUNT (% BY VOLUME) | MATRIX METAL |
|---|---|---|---|---|---|
| EXAMPLE | 1 | TiN: 3% | YCrO$_3$: 39% | 42% | CoCrAlY |
| | 2 | NbN: 20% | Al$_2$O$_3$: 20% | 40% | HASTELLOY C276 |
| | 3 | TaN: 40% | Nd$_2$O$_3$: 40% | 80% | INCONEL 600 |
| | 4 | CrN: 50% | CeO$_2$: 20% | 70% | INCOLOY 800 |
| | 5 | Fe$_3$N: 30% | Y$_2$O$_3$: 50% | 80% | STELLITE 6 |
| | 6 | TiN: 39% | YCrO$_3$: 3% | 42% | CoCrAlY |
| COMPARATIVE EXAMPLE | 1 | NbN: 40% | 0% | 40% | HASTELLOY C276 |
| | 2 | 0% | Al$_2$O$_3$: 40% | 40% | HASTELLOY C276 |
| | 3 | Fe$_3$N: 80% | 0% | 80% | STELLITE 6 |
| | 4 | 0% | YCrO$_3$: 42% | 42% | CoCrAlY |
| | 5 | TiN: 42% | 0% | 42% | CoCrAlY |
| | 6 | 0% | ZrSiO$_4$: 2% | 2% | FeCrAlY |
| | 7 | ZrN: 4% | 0% | 4% | CoNiCrAlY |
| | 8 | 0% | Nd$_2$O$_3$: 60% | 60% | INCONEL 600 |
| | 9 | ScN: 2% | ZrSiO$_4$: 2% | 4% | FeCrAlY |
| | 10 | YN: 3% | ZrO$_2$: 2% | 5% | NiCrAlY |
| | 11 | TiN: 2% | Cr$_2$O$_3$: 3% | 5% | CoCrAlY |
| | 12 | ZrN: 4% | TiO$_2$: 2% | 6% | CoNiCrAlY |
| | 13 | VN: 3% | SiO$_2$: 3% | 6% | NiCr |
| | 14 | TaN: 18% | Nd$_2$O$_3$: 18% | 36% | INCONEL 600 |

A Mn build-up resistance test was performed according to a procedure including the following steps 1 to 3. In step 1, the thermally sprayed surfaces of two thermally sprayed test pieces were arranged facing each other, and MnO powder (the raw material for build-up) was sandwiched between the test pieces and pressed at a load of 0.4 g/mm$^2$. In step 2, the two thermally sprayed test pieces with the MnO powder (the raw material for build up) sandwiched therebetween was placed in an electric furnace and left to stand in a reducing atmosphere of N$_2$-5% H$_2$ at a constant temperature of 950° C. for about 25 hours. In step 3, EPMA (electron probe microanalyzer) surface analysis was performed on the cross-sections of the test pieces.

The results of the surface analysis were rated as good (represented by "A") when the sum of the thickness of Mn adhering to the surface of a thermally sprayed coating and the penetration depth of Mn into the sprayed coating was less than 15 μm. The results were rated as slightly poor (represented by "B") when the sum was 15 μm or larger and less than 20 μm and rated as poor (represented by "C") when the sum was 20 μm or larger. Table 2 shows the results of the Mn build-up resistance test and the rating results.

TABLE 2

Mn BUILD-UP RESISTANCE TEST

| | | THICKNESS OF ADHERING Mn + PENETRATION DEPTH OF Mn (μm) | RATING |
|---|---|---|---|
| EXAMPLE | 1 | 12 | A |
| | 2 | 14 | A |
| | 3 | 5 | A |
| | 4 | 6 | A |
| | 5 | 9 | A |
| | 6 | 14 | A |
| COMPARATIVE EXAMPLE | 1 | 27 | C |
| | 2 | 34 | C |
| | 3 | 20 | C |
| | 4 | 16 | B |
| | 5 | 18 | B |
| | 6 | 42 | C |
| | 7 | 31 | C |
| | 8 | 22 | C |
| | 9 | 24 | C |
| | 10 | 21 | C |
| | 11 | 23 | C |
| | 12 | 21 | C |
| | 13 | 19 | B |
| | 14 | 15 | B |

The thermally sprayed coating in Example 1 contained 3% by volume of TiN being a nitride and 39% by volume of YCrO$_3$ being a multiple oxide, and the results of the Mn build-up resistance test were rated as good represented by "A". The thermally sprayed coating in Example 6 contained 39% by volume of TiN being a nitride and 3% by volume of YCrO$_3$ being a multiple oxide, and the results of the Mn build-up resistance test were rated as good represented by "A". However, as shown in Comparative Example 4, when the nitride used in Example 1 was not used and was replaced with YCrO$_3$, i.e., the amount of YCrO$_3$ was increased to 42% by volume, the results of the Mn build-up resistance test were rated as slightly poor represented by "B". As shown in Comparative Example 5, when the multiple oxide used in Example 1 was not used and was replaced with TiN, i.e., the amount of TiN was increased to 42% by volume, the results of the Mn build-up resistance test were rated as slightly poor represented by "B". Therefore, it was found that when the amount of one of the nitride and oxide was less than 3% by volume, the Mn build-up resistance decreased significantly.

The thermally sprayed coating in Example 2 contained 20% by volume of NbN being a nitride and 20% by volume of Al$_2$O$_3$ being an oxide, and the results of the Mn build-up resistance test were rated as good represented by "A". However, as shown in Comparative Example 1, when the oxide used in Example 2 was not used and was replaced with the nitride, i.e., the amount of NbN was increased to 40% by volume, the results of the Mn build-up resistance test were rated as poor represented by "C". As shown in Comparative Example 2, when the nitride used in Example 2 was not used and was replaced with the oxide, i.e., the amount of $Al_2O_3$ was increased to 40% by volume, the results of the Mn build-up resistance test were rated as poor represented by "C". Therefore, it was found that when the amount of one of the nitride and oxide was less than 3% by volume, the Mn build-up resistance decreased significantly.

The thermally sprayed coating in Example 3 contained 40% by volume TaN being a nitride and 40% by volume of $Nd_2O_3$ being an oxide, and the results of the Mn build-up resistance test were rated as good represented by "A". However, as shown in Comparative Example 14, when the amounts of TaN and $Nd_2O_3$ were each reduced to 18% by volume, the results of the Mn build-up resistance test were rated as slightly poor represented by "B". Therefore, it was found that when the total amount of the nitride and oxide was less than 40% by volume, the Mn build-up resistance decreased.

The thermally sprayed coating in Example 5 contained 30% by volume of $Fe_3N$ being a nitride and 50% by volume of $Y_2O_3$ being an oxide, and the results of the Mn build-up resistance test were rated as good represented by "A". However, as shown in Comparative Example 3, when the oxide used in Example 5 was not used and was replaced with the nitride, i.e., the amount of $Fe_3N$ was increased to 80% by volume, the results of the Mn build-up resistance test were rated as poor represented by "C". Therefore, it was found that when the amount of the oxide was less than 3% by volume, the Mn build-up resistance decreased significantly.

A nitride and an oxide have conventionally been used singly to obtain satisfactory build-up resistance. However, as can be verified from the above results, a combined use of a nitride and an oxide can improve the Mn build-up resistance significantly even when the amount of the combination of the nitride and oxide is the same as the amount of the nitride or oxide used singly.

It was also found that when the prescribed ratios in (1) to (3) described above are satisfied, the Mn build-up resistance is improved.

What is claimed is:

1. A hearth roll having high Mn build-up resistance, the hearth roll comprising a thermally sprayed coating formed on a surface thereof, wherein the thermally sprayed coating includes a nitride of one element selected from the group consisting of Ti, Nb, Ta, Cr, and Fe, an oxide of one element selected from the group consisting of Y, Ce, Nd, Al, and Cr or a multiple oxide of two or more of the elements, and a matrix metal composed of one or two or more metals selected from the group consisting of refractory metals usable at 900° C. or higher, and wherein the following conditional expressions (1) to (3) are satisfied:

$$3\% \text{ by volume} \leq X_1 \leq 50\% \text{ by volume}; \quad (1)$$

$$3\% \text{ by volume} \leq X_2 \leq 50\% \text{ by volume}; \text{ and} \quad (2)$$

$$40\% \text{ by volume} \leq X_1+X_2 \leq 80\% \text{ by volume}; \quad (3)$$

in which $X_1$ is the percentage by volume of the nitride contained in the thermally sprayed coating with respect to the total volume (100% by volume) of the thermally sprayed coating, and $X_2$ is the percentage by volume of the oxide or the multiple oxide contained in the thermally sprayed coating with respect to the total volume (100% by volume) of the thermally sprayed coating.

2. The hearth roll according to claim 1, wherein the matrix metal composed of one or two or more metals selected from the group consisting of refractory metals usable at 900° C. or higher is a matrix metal composed of one or two or more metals selected from the group consisting of NiCr alloys, Hastelloy alloys, Inconel alloys, Incoloy alloys, Stellite alloys, and MCrAlY with M being one or two or more metal elements selected from Fe, Ni, and Co.

3. The hearth roll according to claim 1, wherein the thermally sprayed coating has a thickness of 10 μm or larger and 1,000 μm or lower.

4. The hearth roll according to claim 2, wherein the thermally sprayed coating has a thickness of 10 μm or larger and 1,000 μm or lower.

* * * * *